Patented Nov. 22, 1938

2,137,584

UNITED STATES PATENT OFFICE 2,137,584

METHOD FOR THE PRODUCTION OF SULPHUR-CONTAINING HIGH MOLECULAR WEIGHT COMPOUNDS AND THE PRODUCTS THEREOF

Emil Ott, Elsmere, Del., assignor to Hercules Powder Company, Wilmington, Del., a corporation of Delaware No Drawing. Application July 27, 1936, Serial No. 92,942

8 Claims. (Cl. 260—17)

This invention relates to sulphur derivatives of unsaturated high molecular weight organic materials and to a method for the production thereof. More particularly it relates to sulphide and mercaptan derivatives of unsaturated high molecular weight organic materials and to a method for the production thereof.

In accordance with this invention it has been found possible to effect a reaction between hydrogen sulphide and unsaturated organic materials which contain not less than eight carbon atoms per molecule, to produce mercaptan and sulphide derivatives thereof.

The reaction in accordance with this invention involves the addition of hydrogen sulphide at the unsaturated bonds of the unsaturated high molecular weight organic material originally present, or at double bonds formed by depolymerization or rearrangement during the reaction with the resultant formation, according to the conditions of the reaction, of mercaptans or sulphides. Mono-mercaptans will be formed by simple combination between one molecule of hydrogen sulphide and one molecule of the unsaturated material, while by the interaction of several molecules of each reactant or by the reaction of the mercaptans first formed with itself or with the unsaturated high molecular weight organic compound present, various sulphides and thio-ethers may be formed. In the presence of any oxidizing agent, as, for example, air, the mercaptans will also be converted into di- or polysulphides. The addition of hydrogen sulphide to more than one double bond will result in the formation of poly-mercaptans.

The unsaturated high molecular weight organic material treated in accordance with this invention may be an unsaturated high molecular weight oxygen containing compound, as, for example, drying oil, as, linseed oil, tung oil, hemp oil, soya bean oil, poppy oil, sunflower oil, etc.; a semi-drying oil, as cottonseed oil, corn oil, rapeseed oil, sesame oil, castor oil, etc.; unsaturated animal oils, as menhaden oil, cod-liver oil, shark-liver oil, train oil, neat's foot oil, and lard oil, etc.; an unsaturated animal or vegetable wax, as sperm oil, etc.; an ester of an unsaturated fatty acid, as, a monohydric or polyhydric alcohol ester of crotonic acid, oleic acid, linoleic acid, linolenic acid, ricinoleic acid, etc.; or it may be an unsaturated fatty acid, such as, crotonic acid, oleic acid, linoleic acid, linolenic, ricinoleic acid, etc.; polymerized unsaturated aliphatic acids, as, polymerized acrylic acid, etc.; polymerized unsaturated esters, as, polymerized methyl acrylate, etc. It may, likewise, be high molecular weight unsaturated hydrocarbons, as, rubber, di-iso-butylene, polymerized butadiene, polymerized methyl butadiene, the rubber-like polymer of mixtures of unsaturated hydrocarbons known by the trade name of Vistanex, etc.; or it may be high molecular weight unsaturated chlorinated hydrocarbons, as the polymerized chloroprene known by the trade name of Duprene, etc.

The unsaturated high molecular weight organic material may be treated with hydrogen sulphide in solution in a suitable solvent, such as, for example, petroleum ether, gasoline, butanol, benzene, toluene, xylene, etc., or whether liquid or solid at the temperature employed may be treated without a solvent, under conditions adapted to secure good contact between the material and the hydrogen sulphide. Thus, for example, I may treat a solid material with hydrogen sulphide while being masticated.

By the method in accordance with this invention hydrogen sulphide will be passed through the unsaturated high molecular weight organic material in the form of a solid, a swollen solid, a solid-liquid, a liquid or a solution in a suitable solvent until the reaction is substantially completed, for example, for a period varying from 6 to 72 hours depending upon the conditions of the reaction. The use of any particular temperature is not essential to the reaction, but too low a temperature will decrease the rate of reaction unduly, while too high a temperature will tend to cause decomposition of the reaction product. A temperature range of from about 0° C. to about 300° C. is suitable for the reaction, although a temperature within the range of about 40° C. to 200° C. is preferred. The reaction will progress at any pressure, but the use of superatmospheric pressure is preferred because of the increased rate of reaction and yield of product so obtained. The pressure may accordingly vary from about atmospheric to about 200 atmospheres, although these limits are in no way critical.

Desirably a catalyst will be employed to promote the reaction, although it will be understood that the use of a catalyst is not essential. Suitable catalysts include, for example, acids, such as, sulphuric acid, phosphoric acid, p-toluene sulphonic acid, etc.; or their anhydrides, as, phosphorous, pentoxide, etc.; bases, such as, potassium hydroxide, calcium hydroxide, ethanolamines, monoamylamines, diamylamines, triamylamines, aniline, pyridine, piperidine, quinoline, etc.; metallic selenides, as, NiSe, CdSe, etc.; metallic sulphides, as, NiS, ZnS, CdS, SnS, CuS, B₂S₃, MoS₂, Sb₂S₃, Hg₂S, MnS, etc.; dimethyl sulphate, metallic aluminum; contact catalysts, such as, activated carbon, silica gel, etc. A combination of catalysts, for example, phosphoric acid and silica gel, is often more effective than single catalysts. NiS, CuS, SnS and $H_3PO_4$ with silica gel have been found to be exceptionally active catalysts.

The amount of catalyst used will depend upon the particular catalyst chosen, and will generally be based on the amount of the unsaturated high molecular weight material present. The mineral acid and the basic catalysts will desirably be used in amount approximately equal to amount of the unsaturated high molecular weight compound present, although more or less may be used if desired. The metallic sulphides will desidably be used in amounts within the range of about 5% to about 50% by weight of the high molecular weight organic compound present, although it is possible to use more or less.

The mineral acid catalysts will desirably be employed in concentrations of from 5 to 100%. For example, sulphuric acid in concentrations of 5 to 90% is effective, and phosphoric acid may be used in concentration of from 10 to 98%. When using the mineral acids as a catalyst it is advisable to add the catalyst in portions from time to time during the progress of the reaction rather than in one portion at the beginning of the reaction. These acid catalysts lose much of their activity after having once been used in the reaction, but the reactivity may be restored by adding a small amount of anhydrous or concentrated acid to the spent acid. Reactivation can also be accomplished by heating the spent acid catalyst to about 80° C.–120° C. for about an hour, cooling, and filtering through activated charcoal.

If it is desired to produce mercaptans or thioethers of the unsaturated high molecular weight organic materials unmixed with polysulphides, it is desirable to exclude air, or other oxidizing agents, from the reaction mass in order to avoid oxidation of the mercaptans as formed. The same result may be accomplished by adding an anti-oxidant, as for example, hydroquinone, alpha naphthol, etc., to the reaction mixture. The presence of anti-oxidant will also tend to prevent oxidation of the mercaptan after formation and during storage, shipment, etc.

On the other hand, if it is desired to produce polysulphides, the mercaptans may be oxidized to polysulphides as they are formed by introducing air or oxygen to the reaction zone along with the hydrogen sulphide or independently.

It will be understood accordingly that all examples given for the production of mercaptans will serve likewise for the production of the corresponding polysulphides, it being only necessary to apply oxidation to the reaction mixture, as, for example, by passing air or oxygen into it.

No special form of apparatus is required to carry out the reaction in accordance with this invention. When atmospheric pressure is used, the reaction may be carried out in an open vessel; while reaction under super-atmospheric pressure will be carried out in, for example, an autoclave.

The procedure in accordance with this invention for the production of mercaptans and sulphides is further illustrated by the following examples:

Example I

Fifty cc. of castor oil and 6 g. of stannic sulphide were put into an autoclave equipped for stirring, and contacted with hydrogen sulphide for 6 hours at 150° C. and 100 lbs. per sq. in. hydrogen sulphide pressure. The reaction mixture was then filtered to remove the catalyst. The product analyzed 4.4% sulphur, equivalent to a 45% yield of mercaptan.

Example II

To illustrate the effect of temperature, the above example was duplicated, except that a temperature of 200° C. was used instead of 150° C. The product analyzed 3.2% sulphur showing a 32% yield of mercaptan at 200° C., as compared to 45% at 150° C.

Example III

Seventy-five cc. of castor oil and 9 g. of nickel sulphide were treated with hydrogen sulphide for 2 hours at 150° C. and a pressure of 100 lbs. per sq. in. The reaction was then interrupted and a sample of the oil taken for analysis, with care to remove the sample so that the ratio of catalyst to oil in the remaining material was not appreciably changed. The reaction was then continued for an additional 2 hours under the same conditions of temperature and pressure, and then another sample was removed for analysis. Finally another sample was removed for analysis after 2 more hours of reaction under the same conditions. The analyses of the three samples were as follows:

| Sample | Time | Percent sulphur contained |
| --- | --- | --- |
|  | Hours |  |
| a | 2 | 0.9 |
| b | 4 | 3.1 |
| c | 6 | 5.0 |

The addition of 5% sulphur as in sample c, corresponds to a 52% conversion of the unsaturated castor oil to a saturated mercaptan.

Example IV

Twelve cc. of castor oil and 12 cc. of triethanolamine were treated with hydrogen sulphide at 150° C. for 8 hours at atmospheric pressure. The triethanolamine-hydrosulphide was broken up by washing with dilute hydrochloric acid. After the dilute acid wash, the product was washed with water to remove dissolved hydrogen sulphide and the water-soluble amine hydrochloride. The treated oil analyzed 3.5% sulphur.

Example V

Fifty cc. of linseed oil and 6 g. of cadmium sulphide were contacted with hydrogen sulphide for 6 hours at 100° C. and 100 lbs. per sq. in. hydrogen sulphide pressure. The treated oil analyzed 3.3% sulphur and gave a positive test for mercaptans.

Example VI

Fifty cc. of perilla oil and 6 g. of nickel sulphide on kieselguhr (equivalent to 1.0 g. of nickel sulphide) were treated with hydrogen sulphide in a rotating autoclave for 18 hrs. at room temperature and 200–220 lbs. per sq. in hydrogen sulphide pressure. The product, after the removal of the catalyst analyzed 1.1% sulphur.

Example VII

Two hundred cc. of di-iso-butylene, 3 g. powdered charcoal (Darco), and 200 cc. of 85% $H_3PO_4$ were treated with $H_2S$ in a rotating autoclave for 7 hours at room temperature and 200-250 lbs./sq. in. $H_2S$ pressure. The discharged oil was filtered and washed free of acid. The product analyzed 14.6% sulphur and gave a strong positive test for mercaptan.

Example VIII

One and one-half grams of crepe rubber was dissolved in 100 cc. of hot benzene and the viscous solution placed in an autoclave with 5 g. of nickel sulphide. The autoclave was stirred under 160 lbs./sq. in. pressure of $H_2S$ for a few minutes. The pressure was then released to remove most of the air and then fresh $H_2S$ under 160 lbs./sq. in. pressure of $H_2S$ was admitted, and the autoclave heated to a temperature of approximately 200° C. for a period of 4 hours, while stirring the autoclave at a speed of about 500 R. P. M. The autoclave was cooled and the benzene solution, now less viscous than originally, was centrifuged to remove the catalyst. Alcohol was then added to the benzene solution to precipitate the product, which was then kneaded in alcohol to completely remove the benzene. The alcohol was then removed by warming the product under reduced pressure. Analysis showed the product to contain 6.16% combined sulphur.

Three additional runs using the same general procedure, except for the use of different reaction temperatures and catalysts gave the tabulation below. In the runs using pyridine as a catalyst, the centrifuging treating was omitted.

| Catalyst | Temperature (approx.) °C. | Percent sulphur in product |
|---|---|---|
| NiS | 35 | 1.19 |
| Pyridine | 35 | 0.36 |
| Do | 175 | 3.2 |

Similar runs using 250 cc. of a 5% solution of rubber in benzene at room temperatures with different catalysts, different $H_2S$ pressures and different reaction times gave the following results:

| Catalyst | $H_2S$ pressure Lbs./sq. in. | Time Hours | Percent sulphur in product |
|---|---|---|---|
| 250 cc. 85% $H_3PO_4$ | 160 | 5 | 4.1 |
| None | 180 | 8 | 0.4 |
| 75 cc. 85% $H_3PO_4$ | 150 | 7 | 1.89 |
| 10 g. p-toluene sulphonic acid | 110 | 16 | 3.6 |

Example IX

Ten grams of crepe rubber with no catalyst or solvent were treated with $H_2S$ for 5 hours at room temperature and at 190 lbs./sq. in. $H_2S$ pressure. The product was softer and more translucent than the original rubber, and contained 0.22% combined sulphur.

Example X

Five grams of crepe rubber was kept in contact with 25 cc. of liquid $H_2S$ for 2 hours. The $H_2S$ was then allowed to boil off by releasing the pressure. The product was lighter in color than the original rubber and anlyzed 0.23% sulphur, but was unchanged in its other properties.

Example XI

Crepe rubber was milled with ½% lead tetra-acetate to reduce its viscosity. Two hundred and fifty cc. of a 6% solution of this milled rubber was then placed in an autoclave with 250 cc. of 85% phosphoric acid and treated at room temperature for eight hours under $H_2S$ at a pressure of 275 lbs. per sq. in. The product was recovered following the procedure given in Example VIII and was found to contain 4.6% sulphur.

Example XII

Crepe rubber was milled with no softener present. Two hundred and fifty cc. of a 6% solution of the milled rubber in toluol was added to an autoclave with 250 cc. of $H_3PO_4$ and treated at room temperature for 8 hours under $H_2S$ at a pressure of 170 lbs. per sq. in. The recovered product was found to contain 3.2% sulphur.

Example XIII

One hundred grams of a 5% solution of polymerized chloroprene (Duprene, type D SH-935) was placed in the autoclave with 75 cc. of 85% $H_3PO_4$ as a catalyst, and contacted with $H_2S$ under a pressure of 300 lbs./sq. in. at room temperature for 8 hours. The product was cooled, precipitated by the addition of alcohol and dried. Analysis of this product showed it to contain 2.5% comb'ned sulphur. The properties of the product were considerably changed from those of the original. The original polymer'zed chloroprene was a hard leather-like polymer with little elasticity, while the product of the foregoing treatment was substantially more flexible and had a definite elasticity. The product had also lost the characteristic objectionable odor of the original polymerized chloroprene. The product was also of substantially improved stability as shown by the following test: Small pieces of the original polymerized chloroprene and of the product were placed in test tubes, and pieces of Congo red paper placed in the mouth of each of the test tubes and held by corks. The tubes were then placed in a bath at 90° C. At the end of 2 hours the original polymerized chloroprene had given off sufficient HCl to change the color of the Congo red paper, while 12 hours was required for my product to evolve enough HCl to change the color of the paper.

Example XIV

A sample of polymerized chloroprene was treated overnight in the solid state in the absence of a catalyst with hydrogen sulphide under a pressure of 200 lbs./sq. in. When the $H_2S$ pressure was released the product was found to be a spongy mass having a volume several times that of the original. On standing in air the unreacted $H_2S$ diffused out of this mass. After the product was substantially free of unreacted hydrogen sulphide, the product was found to contain 1.4% combined sulphur, and to be flexible and somewhat spongy in physical characteristics. The characteristic, unpleasant odor of the polymerized chloroprene was removed from the product by washing in gasoline.

Example XV

Twenty grams of a rubber-like polymer of unsaturated hydrocarbons such as iso-butylene, known by the trade name of Vistanex was dissolved in 175 cc. of toluol and contacted with $H_2S$ at a pressure of 225 lbs./sq. in. in the presence of 50 cc. of 85% $H_3PO_4$ at room temperature for 24 hours. The acid was then separated and the toluol solution was freed of acid with water. The treated product was then recovered by evaporation of the solvent. The product was a brownish viscous mass of reduced viscosity as compared with the original. It had a strong odor of mercaptan, gave a positive test for mercaptan, and was found by analysis to contain 1.55% combined sulphur.

*Example XVI*

Fifty grams of a 20% solution polymerized methyl acrylate in ethyl acetate containing 10 grams of the resin, was treated with H₂S at a pressure of 200–225 lbs./sq. in. in the presence of 30 cc. of 85% H₃PO₄, at room temperature for 24 hours. The treated resin was precipitated by the addition of water, and freed of residual solvent by heating on a steam bath. Analysis of the product showed it to contain 4.0% sulphur.

The products, in accordance with this invention, are useful for a variety of different purposes. Thus, the products of the addition of H₂S to the oils are suitable for use as antiskinning agents. The product of the addition of H₂S to polymerized chloroprene is useful for the same purposes for which polymerized chloroprene is used, and will be found to be an improvement thereover due to its resistance to decomposition and evolution of HCl. The product of the addition of H₂S to rubber will be found to be useful for the production of vulcanized rubber, and will be found to vulcanize more readily in the absence of sulphur than untreated rubber does in the presence of sulphur. The various products in accordance with this invention are suitable for use as intermediate products in condensation reactions, for the preparation of trithiocarbonates, etc.

It will be understood that the scope of my invention as broadly described and claimed is in no way limited by the details and examples given herein.

What I desire to claim and protect by Letters Patent is:

1. An organic sulphur compound consisting of the product of the addition of hydrogen sulphide to a double bond of a high molecular weight unsaturated organic compound from the group consisting of a drying oil, a semidrying oil, an unsaturated animal oil, an unsaturated wax, an ester of an unsaturated fatty acid, an unsaturated fatty acid, and a polymerized compound from the group consisting of a polymerized unsaturated aliphatic acid, a polymerized unsaturated ester, rubber, di-isobutylene, polymerized butadiene, polymerized methylbutadiene, a rubber-like polymer of mixtures of unsaturated hydrocarbons, and polymerized chloroprene.

2. An organic sulphur compound consisting of the addition product of the addition of hydrogen sulphide to a double bond of a drying oil.

3. An organic sulphur compound consisting of the addition product of the addition of hydrogen sulphide to a double bond of polymerized chloroprene.

4. An organic sulphur compound consisting of the addition product of the addition of hydrogen sulphide to a double bond of rubber.

5. The method of producing a sulphur-containing organic compound which includes reacting hydrogen sulphide at a double bond of a high molecular weight unsaturated organic compound from the group consisting of a drying oil, a semi-drying oil, an unsaturated animal oil, an unsaturated wax, an ester of an unsaturated fatty acid, an unsaturated fatty acid and a polymerized compound from the group consisting of a polymerized unsaturated aliphatic acid, a polymerized unsaturated ester, rubber, di-isobutylene, polymerized butadiene, polymerized methylbutadiene, a rubber-like polymer of mixtures of unsaturated hydrocarbons and polymerized chloroprene.

6. Method in accordance with claim 5, characterized by the fact that the reaction is carried out at a temperature within the range of about 40° C. to about 200° C.

7. Method in accordance with claim 5, characterized by the fact that the reaction is carried out with hydrogen sulphide under a pressure within the range of about normal atmospheric pressure to about 200 atmospheres.

8. Method in accordance with claim 5, characterized by the fact that the reaction is carried out in the presence of a catalyst which promotes the reaction of hydrogen sulphide at a double-bond of an unsaturated organic compound.

EMIL OTT.